United States Patent [19]

Wilcox et al.

[11] 4,207,951
[45] Jun. 17, 1980

[54] TWO-WAY, MULTIPLE BOTTOM PLOW WITH LIFT ASSIST

[76] Inventors: Allan K. Wilcox, Rte. 1, Box 141, Walnut Grove, Calif. 95690; Mark I. Wilcox, Rte. 1, Box 83, Courtland, Calif. 95615; Steven L. Peek, Box 929, Walnut Grove, Calif. 95690

[21] Appl. No.: 799,373
[22] Filed: May 23, 1977
[51] Int. Cl.² ............................................. A01B 3/30
[52] U.S. Cl. ..................................... 172/225; 172/328
[58] Field of Search ............... 172/204, 212, 224, 225, 172/328, 449, 413, 439

[56] References Cited

U.S. PATENT DOCUMENTS

| | | | |
|---|---|---|---|
| 2,830,519 | 4/1958 | Chandler et al. | 172/328 |
| 3,139,943 | 7/1964 | Evans et al. | 172/449 X |
| 3,174,556 | 3/1965 | Knapp et al. | 172/212 |
| 3,193,306 | 7/1965 | Pettit | 172/449 X |
| 3,196,955 | 7/1965 | Ogle, Jr. | 172/225 |
| 3,207,233 | 9/1965 | Shumaker | 172/328 X |
| 3,517,750 | 6/1970 | Bell | 172/413 X |
| 3,744,573 | 7/1973 | Mellen | 172/225 |
| 3,830,312 | 8/1974 | Brandly | 172/225 |
| 3,980,141 | 9/1976 | Vest, Jr. | 172/225 |

FOREIGN PATENT DOCUMENTS

| | | | |
|---|---|---|---|
| 2146609 | 3/1973 | Fed. Rep. of Germany | 172/225 |
| 1091064 | 11/1967 | United Kingdom | 172/225 |
| 125538 | 12/1971 | United Kingdom | 172/225 |

Primary Examiner—Richard T. Stouffer

[57] ABSTRACT

An improved two-way, multiple bottom plow is described. The plow is provided with an hydraulically actuated lift assist mechanism which works in conjunction with the tractor hitch to lift the plow out of the plowing position. A hydraulic system is provided for automatically pivoting the roll-over portion of the plow from one side of the tractor to the opposite side. Ascension of the roll-over portion of the plow to a point past the vertical is effected by powered hydraulic roll-over cylinder which is then shut off. The roll-over portion of the plow then descends under its own weight against the resistance of trapped pressure fluid which can only bleed off through a restricted orifice. The top hitch between tractor and plow is a spring biased pivotable connection which can "float" relative to the plow.

9 Claims, 13 Drawing Figures

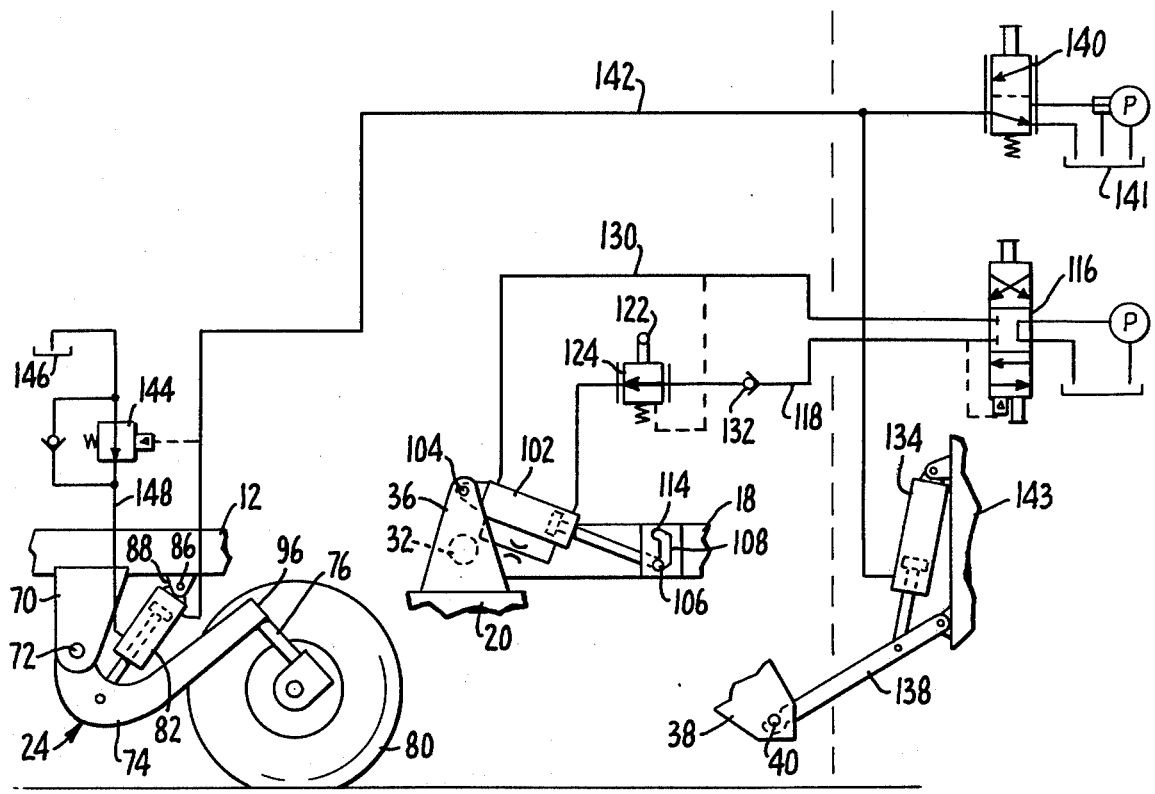
FIG. 8.
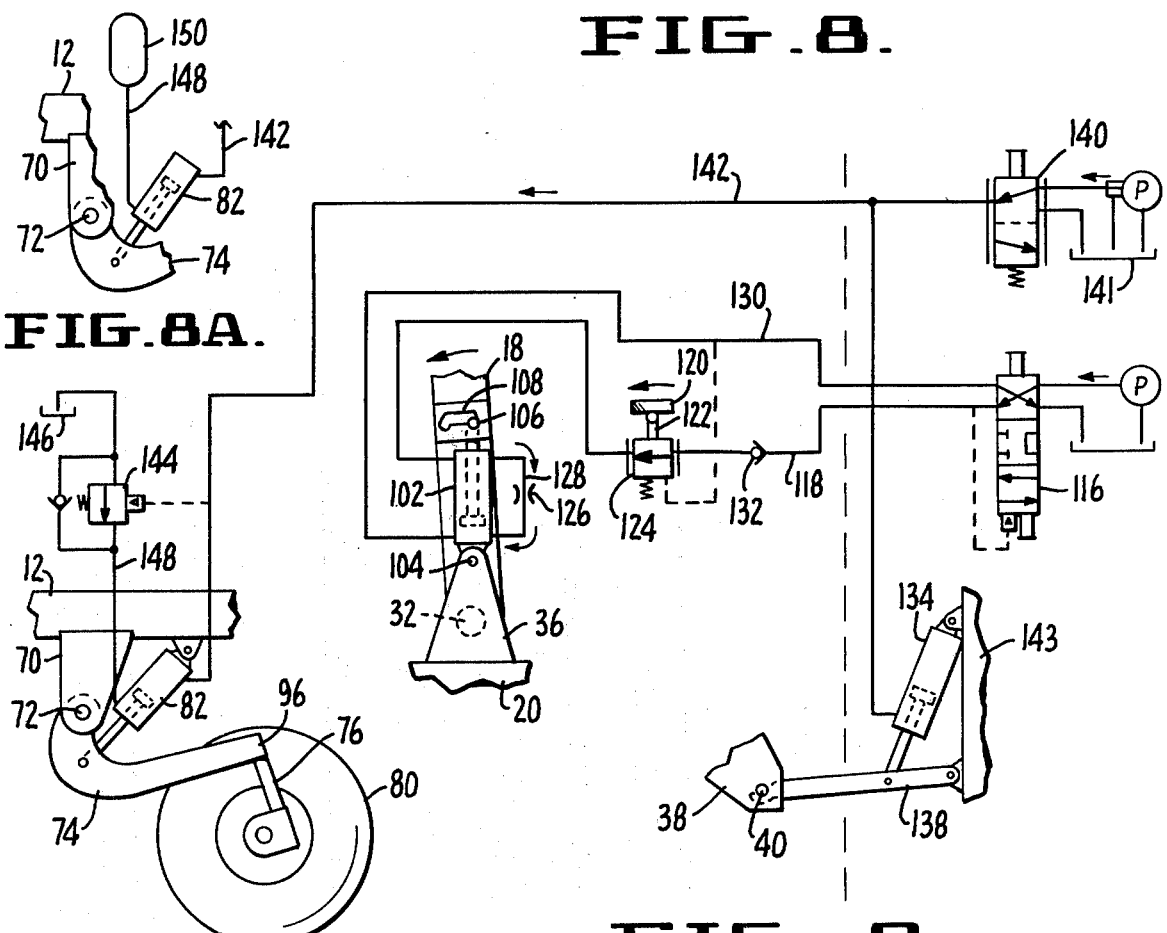
FIG. 8A.
FIG. 9.

TWO-WAY, MULTIPLE BOTTOM PLOW WITH LIFT ASSIST

SUMMARY OF THE INVENTION

The invention relates to two-way, or roll-over, plows and more particularly to an improved multiple bottom, two-way plow with lift assist.

The term "trash" is used by farmers to describe uncleared plant material, such as corn stalks and the like, left over in a field after crop cultivation and harvest. Plowing such a field to prepare a subsequent seedbed can result in the plow becoming plugged with soil and debris between adjacent plow bottoms. Best results are obtained when the space between plow bottoms for the entrance of soil and trash is great enough to provide the necessary clearance to avoid plugging of the plow. In the case of multiple bottom plows of the two-way or roll-over type, the greater spacing required between adjacent plow bottoms for proper trash clearance introduces severe mechanical problems in the design and manufacture of the plows because the extra spacing of the plow bottoms significantly increases the size and weight of the plow and, especially, the roll-over portions of the plows.

It is an object of the present invention to provide a two-way, or roll-over, plow with adequate trash clearance between plow bottoms in which said mechanical problems have been overcome.

Briefly, and in general, the present invention comprises a two-way, multiple bottom plow having a lift assist mechanism acting in conjunction with a standard three-point tractor hitch for lowering and raising the plow to and from its plowing position. Means are provided for automatically pivoting the roll-over portion of the plow through an arc of rotation of approximately 180° from a substantially horizontally disposed first plowing position to a similar, but opposite, second plowing position. Ascension of the roll-over portion of the plow during the first half of its rotation is effected by a fluid pressure cylinder under the control of a decelerating valve which successively decreases the flow of fluid to the cylinder as the roll-over portion of the plow approaches a vertical position and which completely shuts off the flow of pressure fluid to the cylinder once the roll-over portion has passed beyond the vertical. Descent of the roll-over portion of the plow then proceeds under the force of the weight of plow and against the resistance of the pressure fluid in the cylinder, which can bleed from the cylinder only through a restricted orifice. Additionally, the top hitch connection between the plow and the tractor is made through a spring biased pivotable linkage so that the top point of connection between plow and tractor can "float", that is, move relative to the plow.

IN THE DRAWINGS

FIG. 8 is a schematic drawing illustrating the hydraulic system of the plow and tractor with the plow in the plowing position;

FIG. 8A illustrates a variation in the system shown in FIG. 8;

FIG. 9 is a similar schematic drawing of the hydraulic system with the plow in its retracted, or non-plowing position and with the roll-over portion of the plow just past a vertical position;

DETAILED DESCRIPTION OF THE INVENTION

Figure 1:
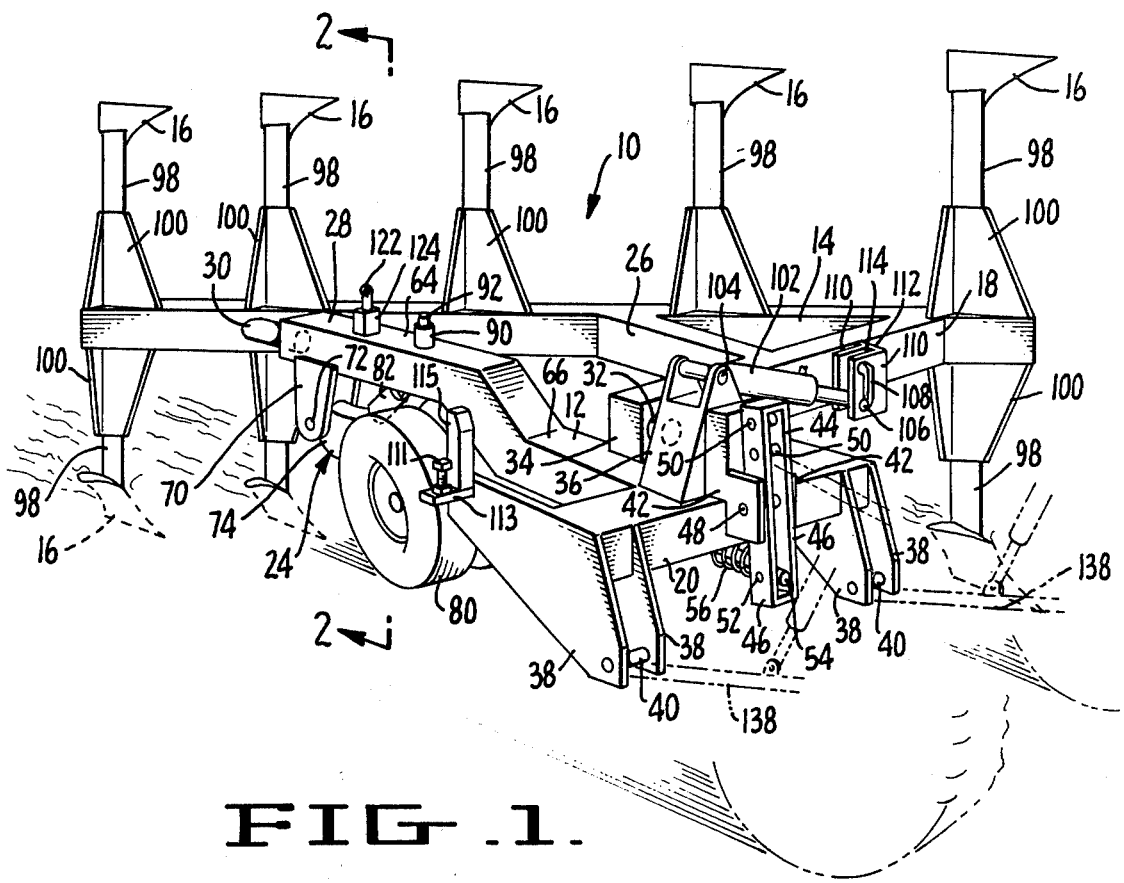
FIG. 1 is a perspective view of a two-way, multiple bottom plow constructed in accordance with the teachings of the present invention.
Figure 2:
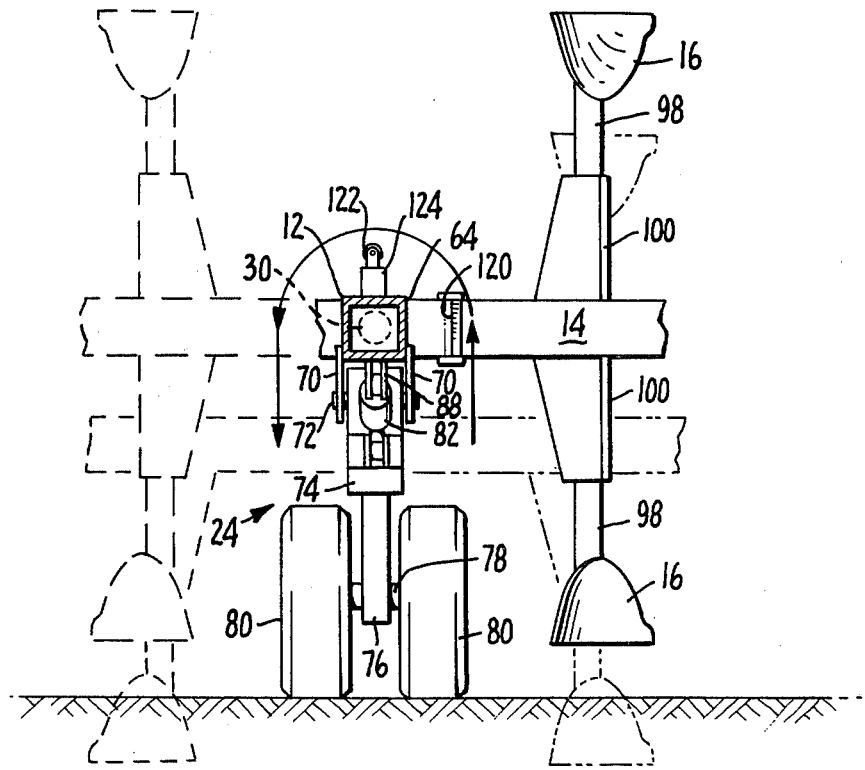
FIG. 2 is a detailed view, partly in section, taken along the line 2—2 in FIG. 1.
Figure 3:
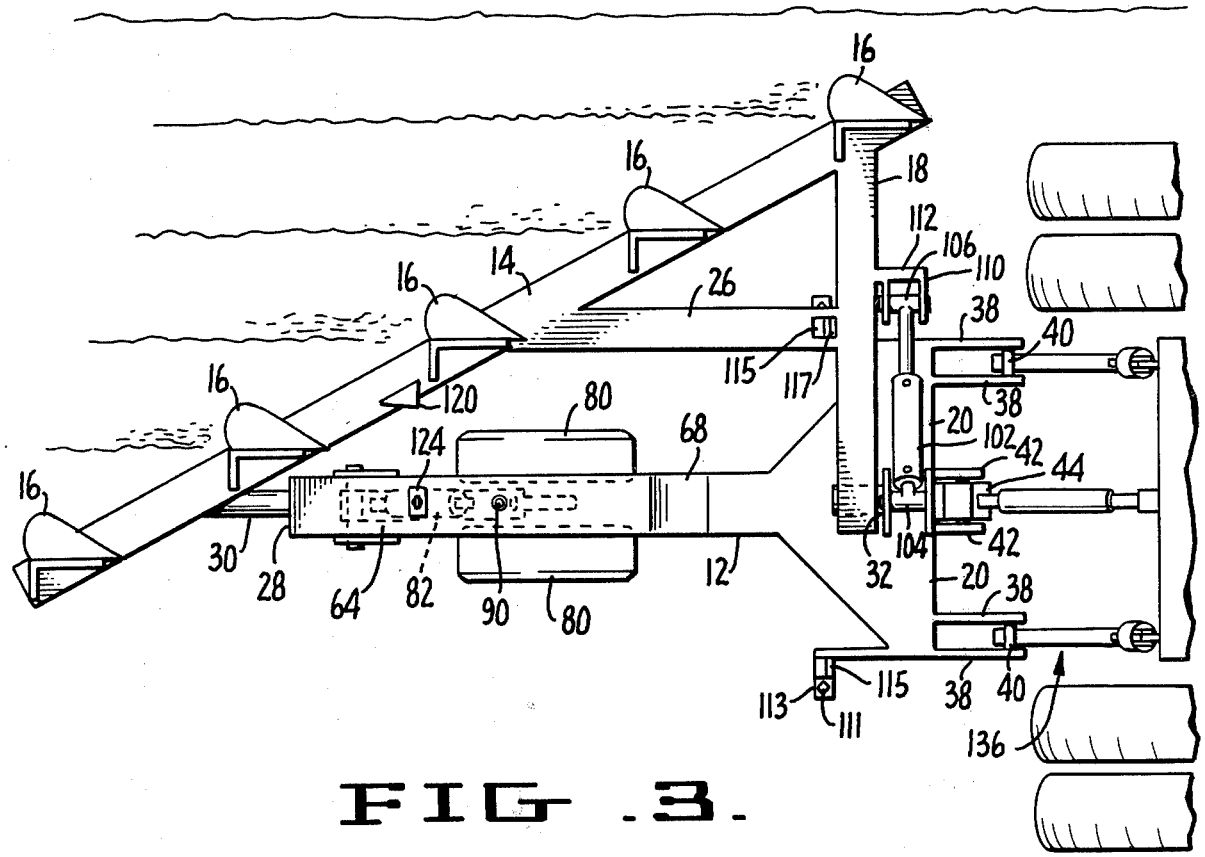
FIG. 3 is a top view of the plow in operation.

Referring first to FIG. 1 there is shown a multiple bottom two-way plow 10 constructed in accordance with the teachings of the invention. The plow 10 comprises a plow chassis or frame 12, a plow supporting bar 14 to which the multiple plow bottoms 16, 16 are attached and which is diagonally disposed relative to the frame, a reversing bar 18 pivotably mounted on the frame for rotating the plow supporting arm from a first, substantially horizontally disposed plowing position to a second similar, but opposite, plowing position, a transverse hitch arm 20, a gauge wheel 80, and a lift assist mechanism 24 for aiding in lowering and raising the plow to and from its plowing position. As shown in the drawings, the frame 12, plow supporting bar 14, reversing arm 18 and hitch arm 20 are made of structurally strong members capable of sustaining large forces and stresses. In preferred form, the structural members are made in the form of box beams. The hitch arm 20 is welded to the plow frame 12 and the outer end of the reversing arm 18 is welded to the plow supporting bar 14. A stiffening member 26 is welded to both the plow supporting bar 14 and the reversing arm 18 and serves to insure the rigidity of the rollover portion of the plow. At its rearward end 28 the plow frame 12 carries a journal bearing (not shown) which receives a short journal shaft 30 fixed to the plow supporting bar 14. A similar journal shaft 32 is fixed to the reversing arm 18 adjacent its free end 34. The shaft 32 is journalled in a suitable bearing (also not shown) provided in a triangular shaped base member 36 welded to the top of the hitch arm 20. Both journal shafts are mounted on the same horizontal axis.

Figure 6:
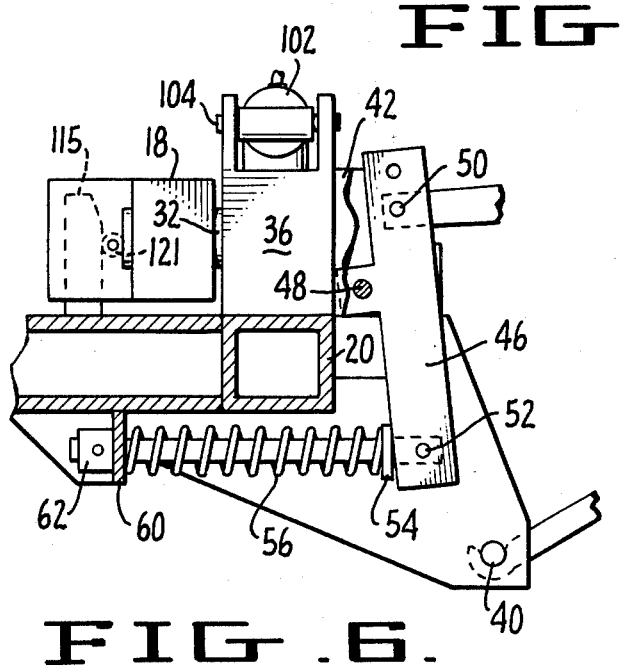
FIG. 6 is a detailed view, partly in section, taken along the line 6—6 in FIG. 5.
Figure 7:
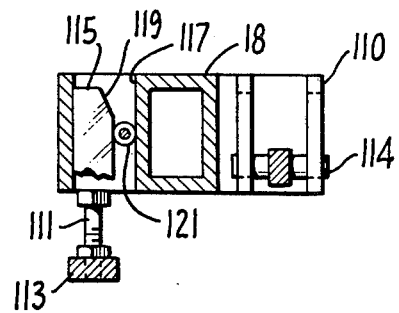
FIG. 7 is a detailed view, partly in section, taken along the line 7—7 in FIG. 5.

The hitch arm 20 is disposed transversely of the frame 12 and is also preferably constructed in the form of a box beam. At its opposite ends, the hitch arm 20 carries two pairs of generally triangular mounting or hitching brackets 38, 38. The brackets in each pair are disposed in close parallel relation to each other and depend below the hitch arm. Hitching pins 40, 40 are horizontally mounted at the lower ends of the brackets 38, 38 for connection to the lower arms of a standard three-point tractor hitch (shown in phantom outline, FIG. 1). Midway between its ends, the hitch arm 20 is provided with another pair of mounting brackets 42, 42. The brackets serve as a mount for a pivotable, spring-loaded hitching bar 44 for the top hitch of a standard three-point tractor hitch. The hitching bar 44 comprises a pair of parallel bars 46, 46 joined at the top and bottom. The bars are pivotably mounted on a horizontal pin 48 in the brackets 42, 42. At their upper ends, the bars 46, 46 carry two hitching pins 50, 50, either of which may serve as the upper connection for the three-point tractor hitch. At their lower ends, the bars 46, 46 are fixed by another horizontal pin 52 to a shaft 54 on which is mounted a coil spring 56. The spring 56 is confined between a retainer 58 on the shaft 54 and a bracket 60 depending from the underside of the plow chassis or frame 12. A collar 62 is pinned to the back end (left end as viewed in FIG. 6) of the shaft 54. The collar 62 permits the spring shaft 54 to move rearwardly of the plow frame but limits movement of the shaft forwardly upon abutment with the bracket. Tension of the spring 56 is preset according to the anticipated load forces to be encountered in the plowing operation. By reason of the described arrangement the connection between the plow and tractor at this upper hitch point "floats" to accommodate sudden movement of the plow relative to the tractor. Accordingly, should the gauge wheel of the plow drop into a hole or engage a large rock, the extreme forces which would otherwise be placed upon the upper tractor hitch are, in large part, absorbed in a compression of the spring 56.

Figure 4:
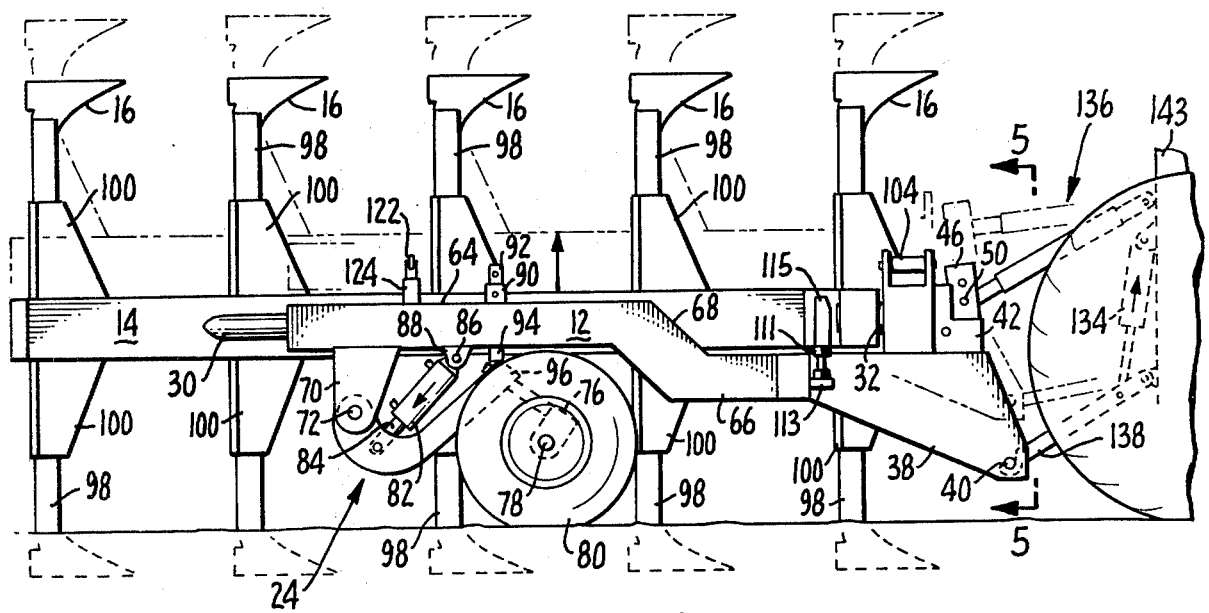
FIG. 4 is a side view of the plow in its plowing position with the non-plowing position of the plow indicated in phantom outline.

The lift assist for the plow is located adjacent the rearward end 64 of the plow frame 12. As is best seen by reference to FIG. 4, the rearward portion 64 of the plow frame is elevated above the forward position 66 of the plow by a transition section 68. Parallel mounting brackets 70, 70 are welded to the underside of the frame and at their ends carry a horizontal pin 72 on which is pivotally mounted an L-shaped arm 74. The arm 74, in turn, is fixedly joined to a similarly shaped leg 76 which rides on an axle 78 between a pair of gauge wheels 80, 80. An hydraulic cylinder 82 and piston are mounted between the arm and the plow frame. The free end of the piston rod 84 is pivotally secured in the arm 74 adjacent the mounting brackets 70, 70 while the opposite end of the cylinder 82 is pivotally mounted on a pin 86 positioned in a pair of mounting brackets 88, 88 on the underside of the plow frame 12. Lowering of the plow frame is limited by an adjustable mechanical stop 90 located on the frame just forward of the mounting brackets 88, 88. The stop 90 comprises a pin 92 having a lower end 94 which may be selectively positioned below the frame for abutting engagement with the free end 96 of the arm 74.

Each plow bottom 16 is secured to a mounting arm 98 that is removably attached to an L-shaped bracket 100 welded to the plow supporting bar 14. The plow bottoms 16, 16 are arranged in oppositely disposed sets except that the points of the bottoms face in the same direction so that each set of bottoms turn the plowed furrows in a direction opposite to the other set. Thus, when alternate sets of plow bottoms are employed, plowing can proceed in adjacent traverses by the tractor and plow with all furrows being turned in the same direction. This permits the plow to be used more efficiently and results in a seedbed that is more level and better suited to irrigation.

Figure 5:
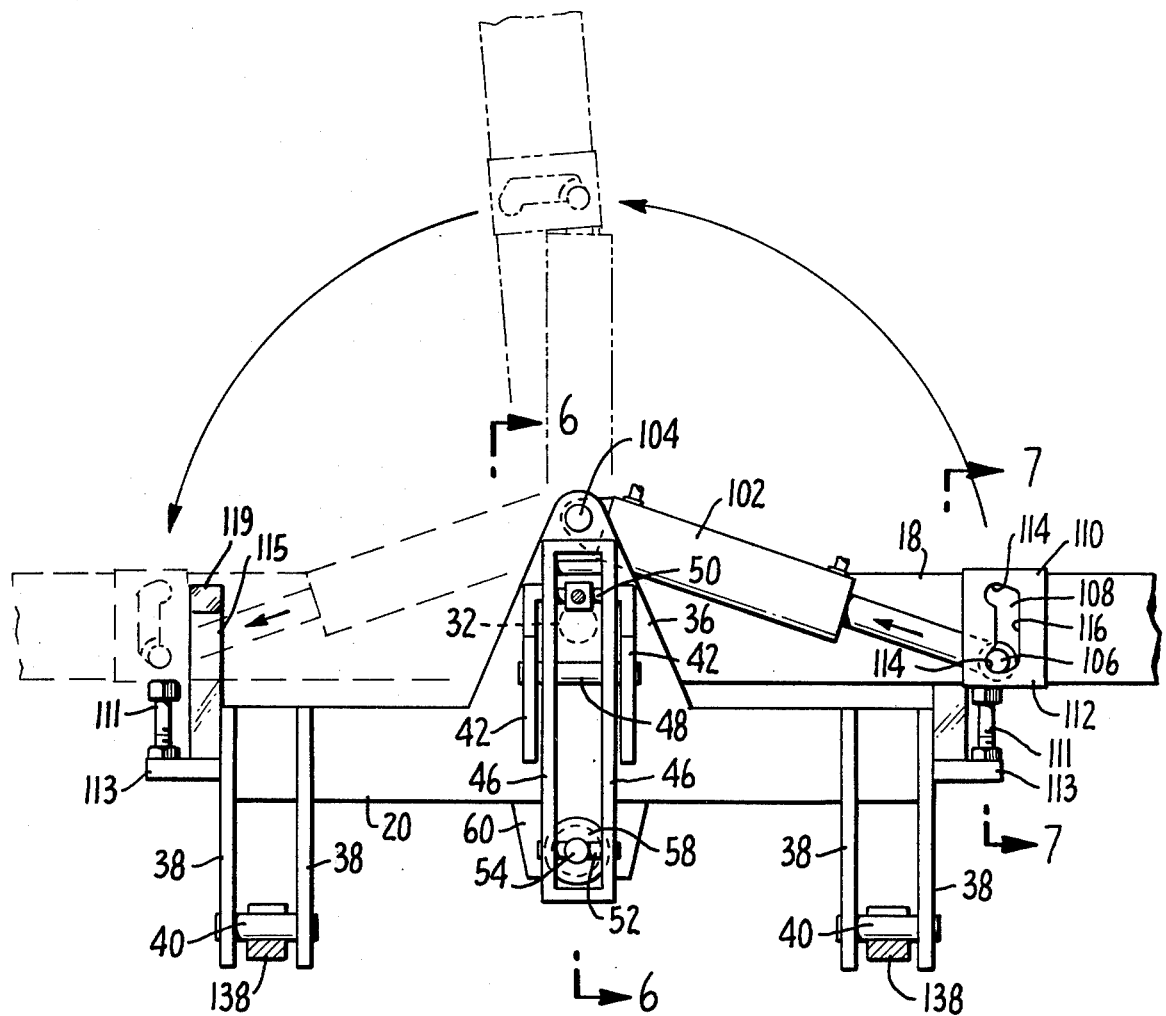
FIG. 5 is a detailed view, partly in section, taken along the line 5—5 in FIG. 4.

The roll-over portion of the plow, that is, the plow supporting bar 14, the reversing arm 18, the stiffener 26 and the opposite set of plow bottoms 16, 16 are mounted for pivotable movement on the journal shafts 30, 32. Pivoting of these members is effected by an hydraulic cylinder 102 and piston. One end of the cylinder 102 is attached to a pin 104 pivotably mounted to the top of the base 36. The free end of the piston rod 106 is formed in the shape of a T and is confined in a pair of identical C-shaped slots 108, 108 formed in opposite walls 110, 110 of a mounting bracket 112 welded to the front surface of the reversing arm 18. As best seen in FIG. 5, each of the slots is formed with two circular openings 114, 114 that are joined by a straight section 116 which is offset from the center line of the circular openings 114, 114. Each circular opening is offset from the centerline of the roll-over portion of the plow and, hence, from the center of gravity for the roll-over portion. By pumping hydraulic fluid into the working end of the cylinder 102, the end of the piston rod 106 is moved tightly against the lower opening 114 and the vertical force component, acting through the rod on the slot, serves to pivot the reversing arm 18, the plow supporting bar 14, and opposite set of plow bottoms 16, 16 through an arc of rotation of substantially 180° to the opposite side of the tractor.

The hydraulic system for effecting the roll-over, or reversal, of the plow bottoms and plow supporting arm is shown schematically in FIG. 9. Operation of the system is initiated by the operator in the tractor cab through actuation of a detent valve 116. The detent valve 116 is moved to its open position and is maintained in said open position by a spring detent (not shown). The detent will hold the valve open until released by back pressure in the system. Adjustment of the spring detent enables the valve to be released upon realization of a predetermined amount of back pressure. When the detent valve 116 is placed in its operating position, pressure fluid is valved to the rod side of the piston within the roll-over cylinder 102 through conduit 118. The force of the pressure fluid on the piston lifts the reversing, or roll-over, arm 18 and consequently the plow supporting bar 14 and plow bottoms 16, 16 and starts the roll-over operation. As the plow supporting bar 14 pivots toward a vertical position, a valveactuating plate 120 secured to the bar contacts the roller cam 122 of a normally-open decelerating valve 124 mounted on the rearward portion of plow frame 12. As rotation of the plow supporting bar continues the plate 120 continues to depress the cam 122 farther inwardly of the valve thereby decreasing the flow of pressure fluid to the cylinder 102. Decreasing the flow of pressure fluid to the cylinder compensates for the fact that as the plow supporting bar 14 pivots during the roll-over operation the amount of pivotal movement of the bar increases relative to the amount of piston travel in the roll-over cylinder. Decreasing the flow of pressure fluid to the cylinder decreases the piston travel in the cylinder and insures a substantially uniform angular travel of the plow supporting bar as the bar approaches a vertical position.

By the time the roll-over portion of the plow has passed its vertical position (shown in FIG. 9), the decelerating valve 124 closes. Closing of the valve 124 produces a back pressure in the system great enough to release the detent on the valve 116 and to allow the valve to automatically return to its normally closed position. Because the circular recesses 114, 114 in the C-slots 108 are offset from the center line of the reversing arm 18, the roll-over portion of the plow will always be past top dead center when the valve 124 shuts off. With the roll-over portion of the plow past center, the remaining portion of the roll-over operation is effected simply by the weight of the plow acting against the piston in the cylinder 102. Further angular travel of the rollover portion of the plow now reverses the direction of travel of the piston in the cylinder. Fluid is forced out of the cylinder 102 through a restricted orifice 126 in a by-pass line 128 to the opposite side of the piston. Restricting the flow of pressure fluid through the orifice 126 controls the downward movement of the plow through the second half of its travel and prevents the plow from slamming against the plow frame.

The roll-over operation is automatic and independent of operator control once the detent valve 116 in the tractor cab is placed in its open position to initiate the operation. Accordingly, the operator is free to look ahead and concentrate on turning the tractor and plow around during the roll-over sequence. By the time the operator has the tractor and plow reversed, the rollover of the plow is completed and the plowing operation in the reverse direction can be started immediately. During the plowing operation when the operator is free to do so, the detent valve 116 is quickly reversed for a brief moment and then returned to its closed position. While the valve is thus briefly open, pressure fluid is valved to the head side of the piston through the line 130 and the piston rod 106 is moved slightly outwardly. This slight outward movement permits the end of the piston rod 106 to drop downwardly into the opposite circular recess 114 in the C-slot 108 where it is in proper position to lift the reversing arm 18 upon the start of the next roll-over operation. A check valve 132 is placed in the line 118 to prevent the "powering down" of the roll-over portion of the plow in the event the operator mistakenly moves the detent valve to the reverse position while the plow supporting arm is in its second half, or downwardly moving, stage. Automatic roll-over operation is achieved by the deceleration valve 124. If desired, the valve 124 can be omitted. In such a case the operator would manually close the valve 116 once the roll-over portion had passed beyond the vertical.

As the roll-over portion of the plow completes its pivotal movement from one side of the tractor to the other, the reversing arm 18 comes to rest upon an adjustable stop member 111 located on a laterally extending pad 113 welded to the side of the bracket 38. Immediately adjacent to the stop member 111, the pad 113 carries an upwardly extending bar 115. The bar 115 is tall enough to extend inwardly of an opening 117 formed in the stiffener 26 and the top of the bar 115 is formed with a beveled face 119 that serves to engage and guide a roller 121 mounted in the opening 117. The longitudinal depth of the opening 117 is such that the bar 115 and roller 121 are snugly accomodated therein. Engagement of the bar and roller is in substantial alignment with a lower hitch connection with the tractor and this cooperative arrangement insures that the pulling force of the tractor is always transmitted to the plow along the longitudinal axis of one or the other of the lower hitch arms 138. An identical arrangement is provided at each side of the plow.

The hydraulic system for lifting and lowering the plow is shown schematically in FIG. 8. Lifting of the plow is effected by two single acting hydraulic cylinders 82, 134. One cylinder 134, or a pair of cylinders in tandem, are located at the tractor hitch 136 and serve to raise the lower arms 138, 138 of the three-point hitch. The second cylinder is the lift assist cylinder 82 positioned between the plow frame 12 and the arm 74.

When the operator wants to raise the plow from its lowered, plowing position, he opens a throttling valve 140 in the tractor cab. Opening of the valve 140 introduces pressure fluid to the cylinders 82, 134 through the line 142. Pressure fluid in the cylinders 82, 134 moves the piston of the tractor hitch inwardly thereby causing the hitch arms 138, 138 to pivot upwardly relative to the tractor 143. At the same time, the piston in the lift assist cylinder 82 moves outwardly causing the arm 74 to rotate clockwise about the pivot 72 so as to raise the rearward end of the plow frame 12. Lowering of the plow is accomplished by the weight of the plow. When the operator wishes to lower the plow, the throttling valve 140 in the cab is closed thus communicating the cylinders 82,134 with the fluid reservoir 141. The weight of the plow then causes the pistons to reverse their travel and to lower the plow.

To protect the lift assist mechanism against damage in the event the gauge wheels 80, 80 fall into a deep hole, a lock valve 144 and auxiliary fluid tank 146 are provided on the flow frame 12. The valve 144 is communicated with the rod side of the piston in the lift assist cylinder 82 by the line 148. The valve 144 is normally closed and in the closed position prevents the exit of fluid from the rod side of the piston. Should the gauge wheels 80,80 fall into a large hole, the fluid trapped behind the piston prevents the leg 74 from pivoting clockwise about the pin 72 and prevents damage to the cylinder and piston which would otherwise occur if the pivoting were not restrained and if it were severe enough. When the main line 142 is under pressure, as when the plow is being raised, the valve 144 is open and fluid behind the piston can escape to the auxiliary tank 146.

In an alternative construction shown in FIG. 8A, the lock valve and tank are replaced by an accumulator 150 which is connected to the rod side of the piston in the cylinder 82. The accumulator 150 resists displacement of the fluid behind the piston and thus serves to prevent injury to the lift assist mechanism. Additionally, the accumulator creates a back pressure behind the piston that aids in restoring the mechanism to its proper positioning.

Figure 10:
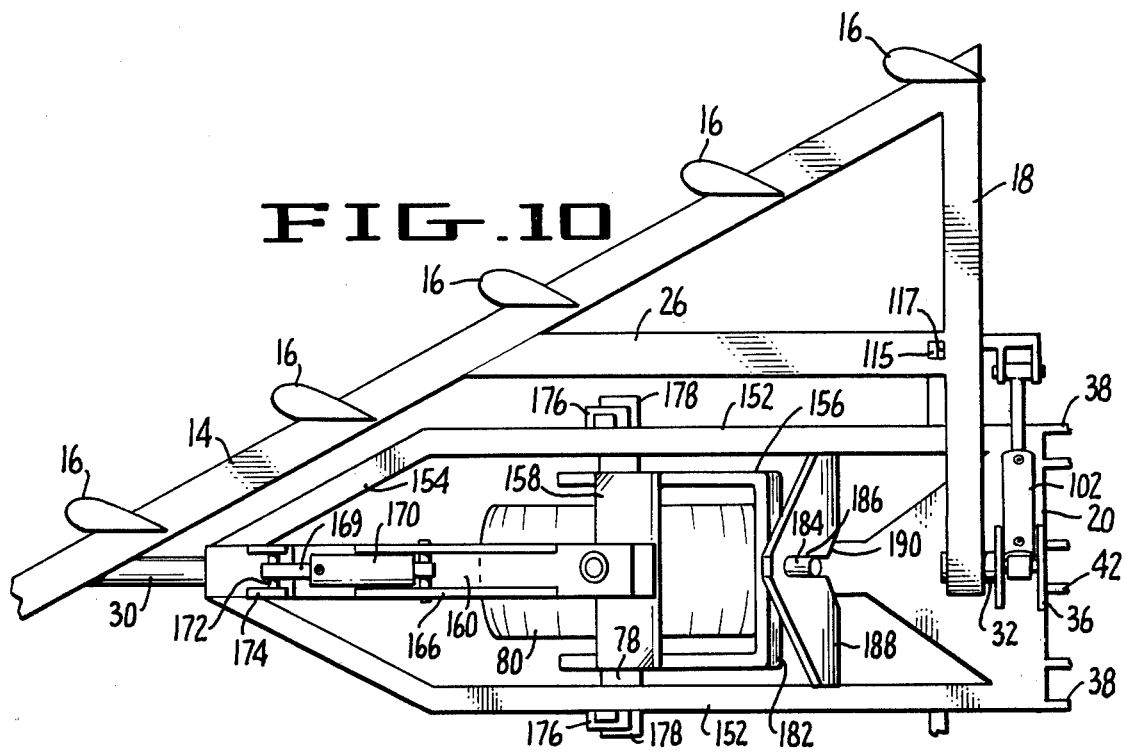
FIG. 10 is a top view of another embodiment of the invention.
Figure 11:
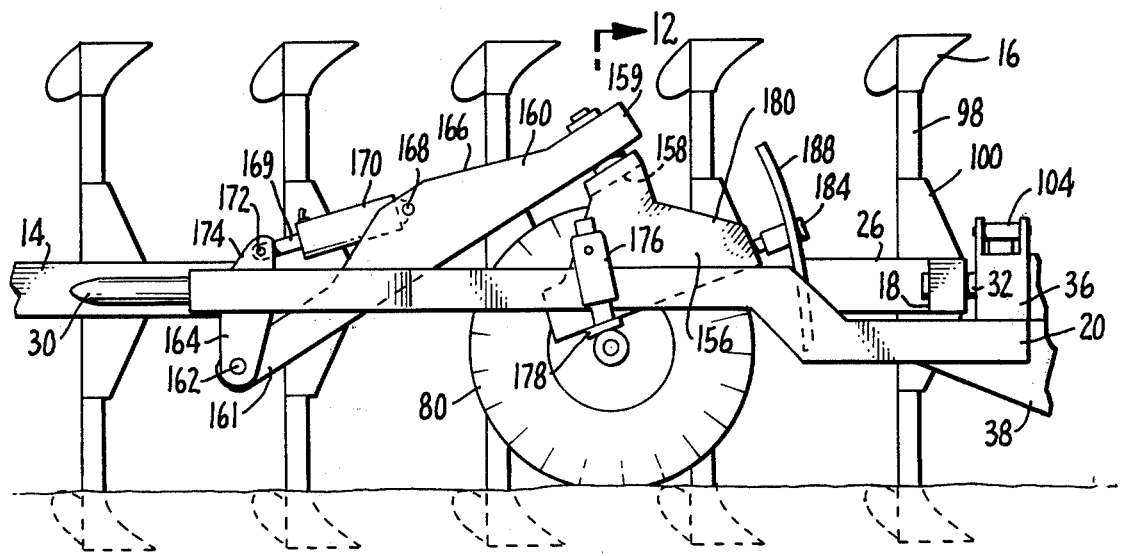
FIG. 11 is a side view of the embodiment of FIG. 10 showing the plow in plowing position.
Figure 12:
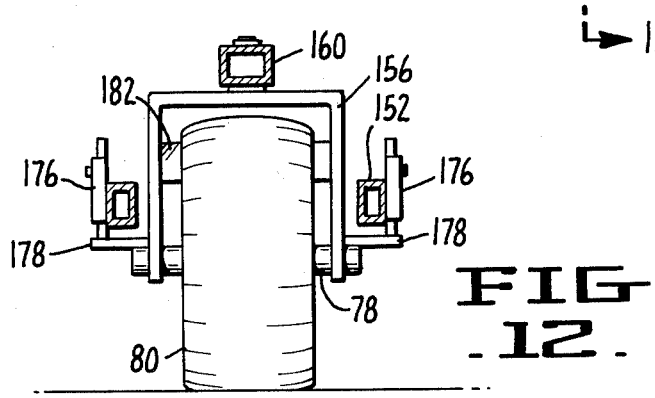
FIG. 12 is a detailed view, partly in section, taken along the line 12—12 in FIG. 11.

An alternate construction for the gauge wheel and lift assist mechanism is shown in FIGS. 10–12. In this form of the invention the gauge wheel 80 comprises a wide, single wheel rather than two parallel wheels of normal size. The greater width of the wheel provides more support for the plow in wet soil conditions. To accomodate the greater width of the wheel, the plow frame is constructed with two parallel side beams 152,152 that are joined at the front of the plow to the ends of the hitch arm 20. At the rearward end of the plow the side beams 152, 152 having converging sections 154, 154 which meet at the center line of the plow. The gauge wheel 80 is positioned between the side beams. The axle 78 for the wheel is mounted in the sides of a yoke 156 which straddles the wheel. The yoke 156 has an upper crossbar 158 that passes over the wheel and the crossbar is connected to the outer end 159 of an actuating arm 160 for the lift assist mechanism. At its opposite end 161 the actuating arm 160 is pivotally mounted on a pin 162 fixed in a pair of mounting brackets 164, 164 depending from the plow frame. The actuating arm 160 has a pair of brackets 166, 166 formed at the sides of the top surface and a pin 168 is positioned between the brackets. An hydraulic cylinder 170 is pivotably connected to the pin. The piston rod 169 for the cylinder is pivotably connected to another pin 172 located in a pair of brackets 174, 174 on the plow frame.

Operation of the lift assist is similar to the embodiment previously described. When pressure fluid is introduced to the cylinder 170 the piston rod is moved outwardly thereby raising the plow frame. Raising of the plow frame causes the yoke 156 to pivot clockwise relative to the wheel 80 (as viewed in FIG. 11). Lowering of the plow is achieved by introducing pressure fluid to the reservoir. Selectively adjustable stops 176, 176 are mounted on the side beams 152, 152 and engage lateral wings 178, 178 formed on the bottom edges of the sides of the yoke 156 to limit the depth of the plow bottoms in the soil.

Normally the wheel 80 is locked against turning during the plowing of each furrow. For this purpose the front end 180 of the yoke 156 has a crossbar 182 to which a laterally-extending pin 184 is attached. When the plow is lowered to its operating position (the desired plowing depth), the pin 184 fits within a slot 186 formed in a locking plate 188 positioned between the side beams 152, 152. The slot 186 terminates at its lower end in a larger divergent opening 190. As the plow is raised the yoke 156 pivots clockwise of the wheel 80 and the pin 184 moves downwardly out of the slot 186 into the opening 190. The wheel 80 is then free to turn as the tractor and plow turn around at the end of the furrow.

What is claimed is:

1. A two-way, multiple bottom plow comprising:
   (a) a plow frame adapted at its forward end for connection to a tractor,
   (b) a plow supporting bar normally disposed at an angle to said plow frame for supporting two sets of oppositely disposed plow bottoms,
   (c) a reversing arm having opposite ends, said arm fixed at one end to the plow supporting bar and pivotally connected to the plow frame at its opposite end,
   (d) fluid pressure means including a cylinder and a movable piston therein and a rod for the piston, said cylinder being pivotally fixed to the plow frame and said piston rod being pivotally fixed to said reversing arm, said fluid pressure means being adapted to introduce pressure fluid into the cylinder to start rotation of said reversing arm and plow supporting bar from a first position at one side of the plow frame toward a second position at the opposite side of the plow frame,
   (e) a control valve operated by rotation of said plow supporting bar and reversing arm for shutting off pressure fluid to said cylinder after said plow supporting bar has passed beyond the vertical position comprising a deceleration valve having a plunger which is engaged by the plow supporting bar as it approaches said vertical position, and
   (f) means in said fluid pressure means for restricting the flow of pressure fluid from said cylinder when the flow of pressure fluid to the cylinder has been shut off to control further rotation of the plow supporting bar beyond the vertical position.

2. A two-way, multiple bottom plow as set forth in claim 1 wherein said means for restricting the flow of pressure fluid from the cylinder comprises a by-pass line connecting one side of the piston with the opposite side of the piston and having a restricted orifice therein.

3. A two-way, multiple bottom plow comprising:
   (a) a plow frame adapted at its forward end for connection to a tractor,
   (b) a plow supporting bar normally disposed at an angle to said plow frame for supporting two sets of oppositely disposed plow bottoms,
   (c) a reversing arm having opposite ends, said arm fixed at one end to the plow supporting bar and pivotally connected to the plow frame at its opposite end,
   (d) fluid pressure means including a cylinder and a movable piston therein and a rod for the piston, said cylinder being pivotally fixed to the plow frame and said piston rod being pivotally fixed to said reversing arm, said fluid pressure means being adapted to introduce pressure fluid into the cylinder to start rotation of said reversing arm and plow supporting bar from a first position at one side of the plow frame toward a second position at the opposite side of the plow frame and
   (e) control means for shutting off pressure fluid to said cylinder after said plow supporting bar has passed beyond the vertical position
   (f) wherein said plow frame is provided with a transverse hitch arm having spaced connections for engagement with the lower arms of a three-point hitch on a tractor, and cooperative engagement means on the hitch arm and the reversing arm in substantial alignment with said spaced connections for engagement when said plow supporting bar is in said first or second positions whereby the pulling force of the tractor is always transmitted to the plow supporting bar along the longitudinal axis of one or the other of the lower hitch arms of the tractor.

4. A tractor having a three-point hitch and means for raising that hitch, a two-way, multiple bottom plow for use with said tractor, said plow including
   (a) a plow frame adapted for connection to the three-point hitch of the tractor,
   (b) a plow supporting bar normally disposed at an angle to said plow frame having two sets of oppositely disposed plow bottoms mounted thereon,
   (c) a reversing arm having opposite ends, one end being fixed to the plow supporting bar and the opposite end being pivotally connected to the plow frame,
   (d) a gauge wheel pivotally secured to said plow frame,
   (e) fluid pressure means including a first hydraulic cylinder having a movable piston therein and a rod for the piston, said cylinder being pivotally fixed to the plow frame and the piston rod being pivotally fixed to the reversing arm, said fluid pressure means being adapted to introduce pressure fluid into the cylinder to start rotation of said reversing arm and plow supporting bar from a first position at one the side of the flow frame toward a second position at opposite side of the plow frame,
   (f) said pressure fluid means including a second hydraulic cylinder having a movable piston therein and a rod for the piston, said second cylinder being pivotally fixed to the plow frame and the piston rod being pivotally fixed to the gauge wheel, said pressure fluid means being adapted to introduce pressure fluid into said second cylinder to raise the plow frame relative to the gauge wheel at the same time the tractor hitch is raised by said means for raising the tractor three-point hitch, and
   (g) a deceleration valve on the plow frame, said valve having a depressable plunger for gradually closing off the flow of pressure fluid to said first hydraulic cylinder, said plunger being engaged and depressed by the plow supporting bar as it approaches a vertical position during its rotation from said first plowing position to said second plowing position to close off said flow of pressure fluid after the plow supporting bar has passed beyond the vertical position.

5. The two-way, multiple bottom plow of claim 14 further comprising
   (h) a by-pass line connecting one side of the piston in said first cylinder to the opposite side of the piston having a restricted orifice therein for restricting the flow of fluid from said cylinder when the flow of pressure fluid to the first cylinder has been shut off to control further rotation of the plow supporting bar beyond the vertical position.

6. In a two-way, multiple bottom plow having a plow frame adapted at its forward end for connection to a tractor and a plow supporting bar for supporting two sets of oppositely disposed plow bottoms, the combination of means for rotating said plow bottoms and plow supporting bar through about 180° to reverse the plow bottoms, said means comprising:
   (a) a reversing arm having opposite ends, said arm being fixed at one end to the plow supporting bar and pivotally connected to the plow frame at its opposite end,
   (b) fluid pressure means including a cylinder and a movable piston therein and a rod for the piston, said means being pivotally fixed to the plow frame and to said reversing arm, said means being adapted to rotate said reversing arm and plow supporting bar whenever pressure fluid is introduced to said cylinder,
   (c) control means for shutting off pressure fluid to said cylinder after said plow supporting bar has passed beyond a vertical position, and
   (d) means in said fluid pressure means for restricting the flow of fluid from said cylinder when said control means has shut off pressure fluid to the cylinder comprising, said restricting means being in a by-pass line conntecting one side of the piston with the opposite side of the piston of said cylinder, whereby further rotation of said plow supporting bar occurs under its own weight against the resistance of the pressure fluid in said cylinder.

7. A two-way, multiple bottom plow for use with a tractor having a three-point hitch comprising:
   (a) a plow frame having a transverse hitch arm at its forward end for connection to a tractor,
   (b) a plow supporting bar normally disposed at an angle to said plow frame for supporting two sets of oppositely disposed plow bottoms,
   (c) a reversing arm having opposite ends, said arm fixed at one end to the plow supporting bar and pivotally connected to the plow frame at its opposite end,
   (d) fluid pressure means for moving said reversing arm and plow supporting bar from a first position at one side of the plow frame toward a second position at the opposite side of the plow frame,
   (e) spaced connections on said transverse hitch arm for engagement with the lower arms of the three-point hitch of the tractor; and
   (f) cooperative engagement means on the hitch arm and the reversing arm in substantial alignment with said spaced connections for engagement when said plow supporting bar is in said first or second positions whereby the pulling force of the tractor is always transmitted to the plow supporting bar along the longitudinal axis of one or the other of the lower hitch arms of the tractor.

8. A two-way, multiple bottom plow as set forth in claim 7 wherein the fluid pressure means has a piston rod which pivotally connects to said reversing arm at a point offset from the plane defined by the axis of rotation and the center of gravity for the reversing arm and plow supporting bar.

9. A two-way, multiple bottom plow as set forth in claim 7 wherein the hitch arm carries a pivotally mounted third hitch connection for engagement with the upper arm of a three-point tractor hitch and spring means between said connection and hitch arm, for absorbing excessive forces on said hitch connection.

* * * * *